United States Patent [19]

Conti

[11] Patent Number: 4,463,924
[45] Date of Patent: Aug. 7, 1984

[54] PICTURE LOCKING AND STRAIGHTENING DEVICE

[76] Inventor: Mario W. Conti, 7616-A El Camino Real, Carlsbad, Calif. 92008

[21] Appl. No.: 417,224

[22] Filed: Sep. 13, 1982

[51] Int. Cl.³ ............................................. F16M 13/00
[52] U.S. Cl. ...................................... 248/553; 40/607;
          211/4; 248/477; 248/492; 248/496
[58] Field of Search ............... 248/553, 477, 492, 496,
          248/498; 40/152.1, 607; 248/329, 330.1, 579;
          211/4; 70/62, 61, 59

[56] References Cited

U.S. PATENT DOCUMENTS

| 885,172 | 4/1908 | Patrick | 248/492 |
| 1,310,096 | 7/1919 | Terp | 248/492 |
| 2,463,110 | 3/1949 | Johnson | 248/496 |
| 2,984,440 | 5/1961 | Simons | 248/477 |
| 3,958,694 | 5/1976 | Pritz | 211/4 |
| 4,018,339 | 4/1977 | Pritz | 248/553 |
| 4,028,913 | 6/1977 | Falk | 248/553 |

FOREIGN PATENT DOCUMENTS

| 493113 | 5/1950 | Belgium | 40/145 |
| 27071 | of 1914 | United Kingdom | 248/492 |

Primary Examiner—William H. Schultz
Assistant Examiner—Ramon O. Ramirez
Attorney, Agent, or Firm—Edgar W. Averill, Jr.

[57] ABSTRACT

A lockable picture hanging and straightening device for securing a picture to a wall. The device has a channel member which passes into and is locked into a rectangular member. A reel is attached to the rectangular member and a line acting as an adjustable length linkage is affixed from a convenient corner of the painting to the reel, and the reel is tightened to an extent that the picture is level. The point of attachment of the line to the picture must be on the side of the picture which is too low.

10 Claims, 8 Drawing Figures

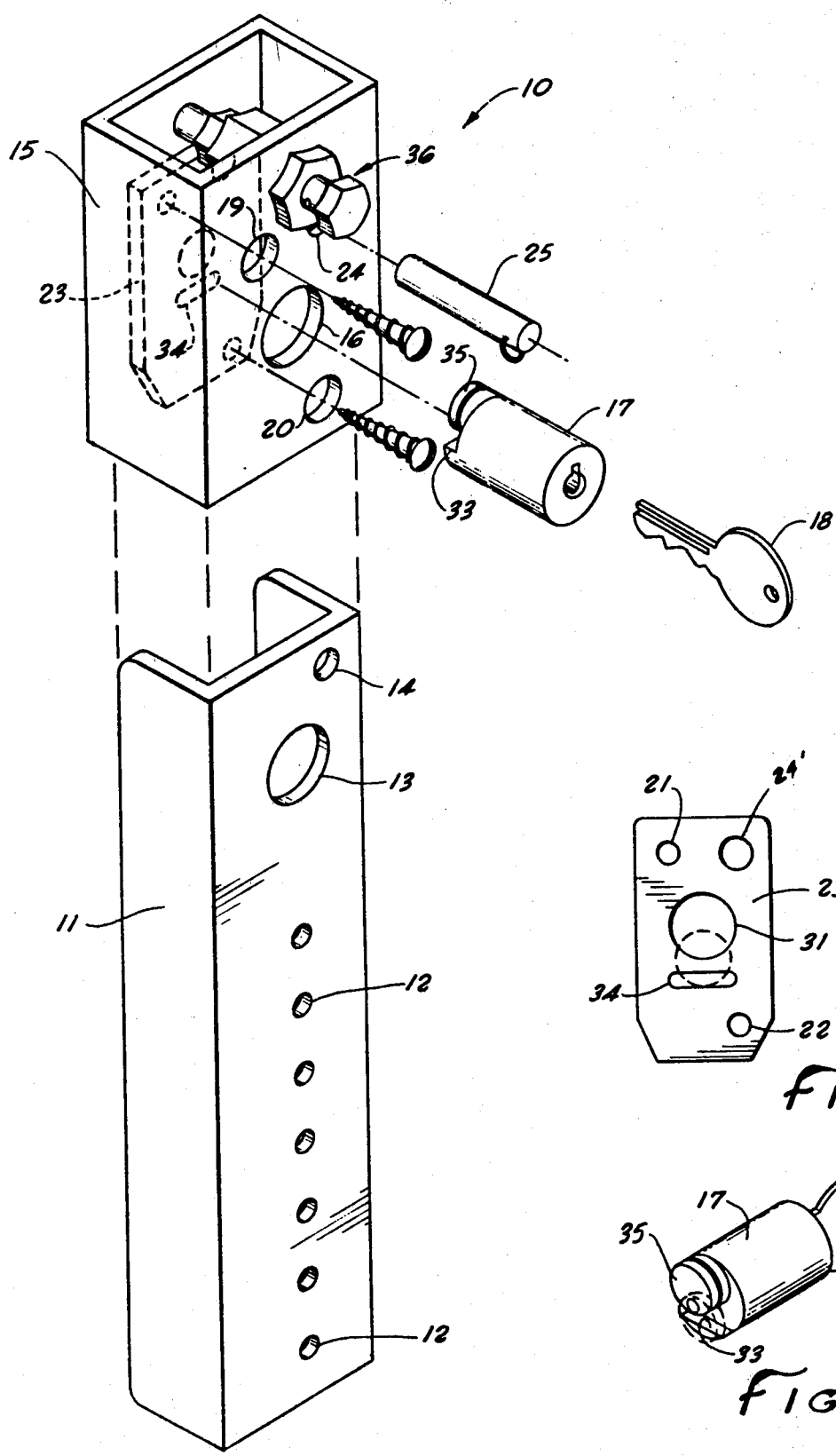
Fig. 1
Fig. 7
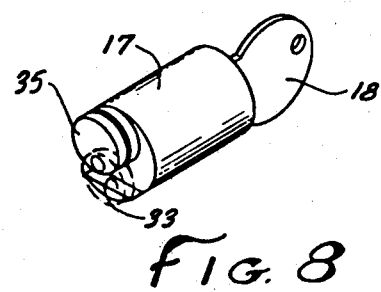
Fig. 8

PICTURE LOCKING AND STRAIGHTENING DEVICE

BACKGROUND OF THE DISCLOSURE

The field of the invention is picture hanging devices, and the invention relates more particularly to devices of the type which lock the picture to the wall in a secure manner. The invention also relates to a picture straightening device.

It is becoming increasingly more popular to hang paintings in public places such as banks, hotels, offices and the like. With the increasing value of many paintings, theft has become a problem and there is a need for a device which can securely affix a picture to a wall. The device must permit the easy removal of the painting from the walls.

There is also a need for some means for permanently straightening a painting, and this need is particularly accute in public places where the painting may be touched and misaligned many times a day. While most means for securing a picture to a wall includes bolting the picture to the wall in some manner, such means do not permit the ready removal of the painting, and in the event the painting is misaligned when affixed to the wall, this cannot be changed.

SUMMARY OF THE INVENTION

It is an object of the present invention to provide a picture hanging and straightening device which will permit the ready removal of the painting from the device as well as means for maintening the painting in a desired orientation.

The present invention is for a lockable picture hanging and straightening device comprising a channel member having a means for attachment to the frame of a picture. The channel member has an opening passing therethrough shaped to fit lock means. A rectangular member has holes for attachment to a wall and also has an opening in the side furthest from the wall for passage of the lock means. Lock means are provided which pass through the rectangular member and through the channel member and are held into a lock plate at the back of the channel member. Reel means are attached to the rectangular member and the reel means have means for adjusting the length of a line which is attached thereto. The line may be affixed to a lower corner of the painting, and the painting may thus be straightened by tightening or loosening the reel means. A particularly effective style of lock is that which is referred to as a telephone dial lock.

BRIEF DESCRIPTION OF THE DRAWINGS

FIG. 1 is an exploded perspective view of the device of the present invention.

FIG. 7 is a plan view of the lock plate of the device of FIG. 1.

FIG. 8 is a perspective back view of the lock means of the device of FIG. 1.

DESCRIPTION OF THE PREFERRED EMBODIMENTS

Figure 2:
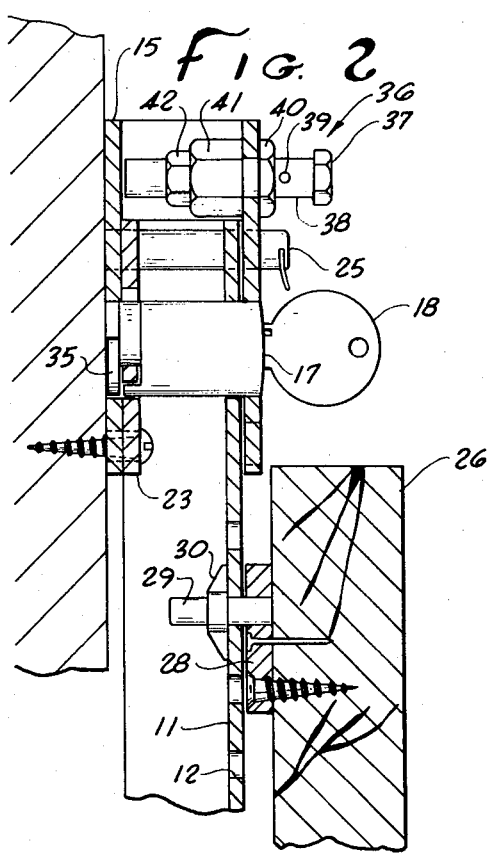
FIG. 2 is a side view partly in cross section of the device of FIG. 1.

A picture hanging and straightening device is shown in exploded perspective view in FIG. 1 and indicated generally by reference character 10. Channel member 11 has a plurality of holes 12 for attachment of the channel member to the frame of a painting as set forth in more detail below. A large circular opening 13 is located near the top of channel member 11 and is used for passage of a lock therethrough. A small opening 14 is used to temporarily hold the channel member 11 to the rectangular member 15 while the lock is being inserted through the assembly. Rectangular member 15 has an opening 16 for passage of lock 17 which is turned by key 18. A pair of holes 19 and 20 permit access to a matching pair of holes 21 and 22 in lock plate 23. A matching pair of holes not shown is located on the back surface of rectangular plate 15. A smaller opening 24 is positioned to align with opening 14 and channel member 11 when channel member 11 is inserted into rectangular member 15. Opening 24 aligns with opening 24' in lock plate 23. In this way, pin 25 may be temporarily inserted through openings 24, 24' and 14 to hold the channel member in place while lock 17 is being placed through holes 16 and 13.

Turning now to FIG. 2, the frame 26 of painting 27 is secured to plate 28 to which pin 29 is welded or otherwise securely affixed. After attachment, pin 29 is inserted through an appropriate hole 12 in channel member 11 and securely held thereto by a speed nut 30. Pin 29 may be threaded and may be held to channel member 11 by a lock nut or other conventional holding member. After attahchment of the frame to channel member 11, the upper end of channel member 11 is inserted through the central opening of rectangular member 15. Pin 25 is used to secure channel member 11 in rectangular member 15. The lock 17 is then inserted through the openings 13, 16 and 31 and locked securely in place. In this manner, the painting cannot be removed without destroying the frame since the speed nut is not accessible since the wall covers the open side of channel member 11.

A particularly effective type of lock for use with the present invention is a telephone dial lock. Such locks are readily available and relatively inexpensive and as shown in FIG. 8 have a cylindrical body and a smaller cylindrical disc 35 which is pivoted from a point away from its center and which turns when key 18 is turned. Lock 17 has a lower protrusion 33 which fits into slot 34. Disc 35 fits through hole 31 when disc 35 is in its uppermost orientation. When the lock is turned, it covers the area of lock plate 23 which is between hole 31 and slot 34 thus holding lock 17 securely into lock plate 23.

The picture locking and hanging device of the present invention, unlike most picture locking devices permits the leveling of the painting since it is pivotable about pin 29. A reel means indicated generally by reference character 36 has a bolt 37 having a shaft 38 which is affixed to rectangular member 15. Shaft 38 has a hole 39 passing therethrough which permits the easy attachment of a line such as a monofilament nylon line. The end part of shaft 38 is threaded and a nut 40 is on the outside of member 15 and a nut 41 is on the inner surface. Nut 41 may be a tightenable nut by cooperation with lock nut 42 so that the reel may be tightened in the desired position.

Figure 5:
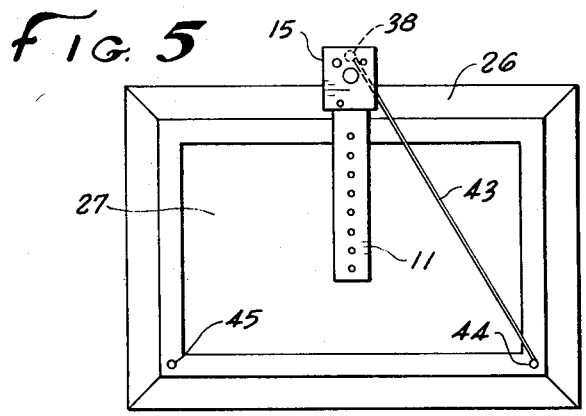
FIG. 5 is a back view of the painting and a portion of the device of FIG. 1.

The back of a painting is shown in FIG. 5 where a nylon filament line 43 is affixed to a hook or eye 44 and the shaft 38 is turned until the picture is straight. Line 43 could alternatively have been affixed to hook or eye 45 if that were the lower corner.

Figure 4:
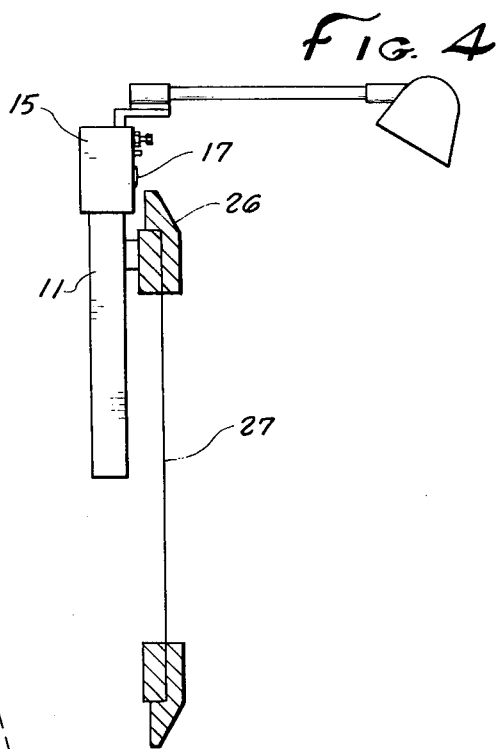
FIG. 4 is a side view of the device of the present invention further including a painting and illumination means for the painting.
Figure 6:
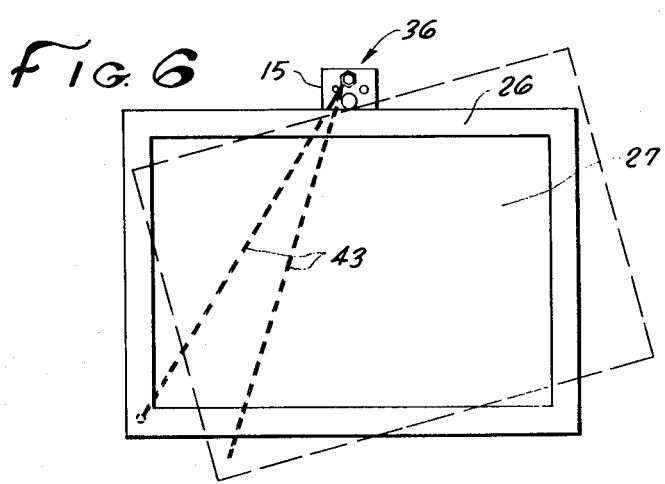
FIG. 6 is a front view of a painting affixed to the device of FIG. 1.

As shown in FIG. 4, the picture hanging device of the present invention may be readily used to support illumination means 46 which is particularly appropriate for paintings in a public place.

Figure 3:
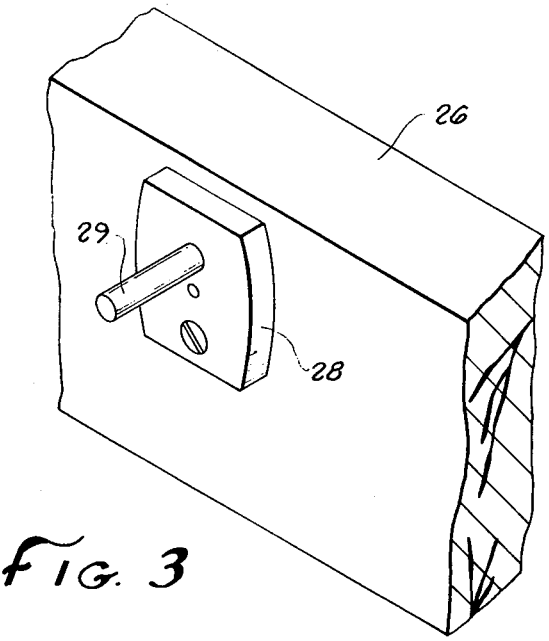
FIG. 3 is a perspective view of a lock plate of the device of FIG. 1 attached to a painting frame.

While the device of the present invention has been shown utilizing a telephone dial lock, other lock means could, of course, be utilized. While a rectangular member and a channel member are particularly appropriate for use with the present invention, these could be circular members or members of other cross-sectional shapes. While the plate and pin arrangement shown in FIGS. 2 and 3 of the drawings are preferred, other means for attaching channel member 11 to a picture frame could be used such as merely screwing channel member 11 to the frame from the back of channel member 11. It is preferable, however, that the support point be freely rotatable so that the picture straightening portion of the present invention may be utilized in conjunction therewith. While the lock plate 23 is shown as a separate piece, it could, of course, be made an integral part of rectangular member 15.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A lockable picture hanging and straightening device comprising:
   a channel member having means for attachment to the frame of a picture, said channel member having an opening therethrough for passage of a lock means;
   a rectangular member having holes for attachment to a wall and having an opening in the side of the rectangular member which is furthest from the side which is attached to the wall, said rectangular member having means for affixing lock means thereto and further having inside dimensions sufficient to permit the passage of the channel member therethrough;
   lock means having an outside dimension such that it fits and passess through the openings in the rectangular member and in the channel member and into the means for affixing so that the channel member is locked to the rectangular member when the lock means is inserted through the rectangular member and the channel member;
   reel means attached to said rectangular member, said reel means having means for attachment of a line means and further having means for adjusting the length of the line means in a secure manner, whereby when a picture is affixed to said channel means and the channel means is inserted through the rectangular means and a line is affixed to one lower corner of the painting, that the picture can be straightened by the movement of the reel means and is held to the wall by the lock means.

2. The device of claim 1 wherein said lock is a cylindrical lock means and the openings in the channel member and the rectangular member for the passage of the lock means are circular.

3. The device of claim 2 wherein said lock means has a key and a cylindrical body and has a cylindrical disc smaller than the cylindrical body which disc is pivoted about a point away from its center when the key is turned.

4. A lockable picture hanging device comprising:
   a channel member having means for attachment to the frame of a picture, said channel member having an opening therethrough for passage of a lock means;
   a rectangular member having holes for attachment to a wall and having an opening in the side of the rectangular member which is furthest from the side which is attached to the wall, said rectangular member having means for affixing lock means thereto and further having inside dimensions sufficient to permit the passage of the channel member therethrough; and
   lock means having an outside dimension such that it fits and passes through the openings in the rectangular member and in the channel member and into the means for affixing lock means so that the channel member is locked to the rectangular member when the lock means is inserted through the rectangular member and the channel member thereby locking the picture to the wall.

5. The device of claim 4 further including a lock plate affixed to the side of the rectangular member which is affixable adjacent a wall, said lock plate having openings which match the openings in the rectangular member so that when the lock plate and rectangular member are screwed to a wall, the lock plate is held to the rectangular member and said lock plate having means for attachment of said lock means.

6. The device of claim 4 wherein said lock means is a telephone dial lock.

7. The device of claim 4 further including a plate having a rod affixed thereto extending in one direction therefrom and having means for attachment to a picture frame and wherein said channel member has a plurality of holes therethrough for passage of said rod therethrough and affixment of the rod to the channel whereby the picture frame is securely affixable to a picture, mirror and the like.

8. The device of claim 4 further including a set of matching holes in the rectangular member and the channel member and a matching rod whereby the channel member and the rectangular member can be temporarily held together while said lock means is being inserted in its proper location.

9. A picture hanging and straightening device comprising:
   a picture mounted in a rectangular frame, said frame having a pin affixed to the upper edge thereof;
   a hanging plate attachable to a wall said hanging plate having means for holding said pin in a manner to permit the pin to pivot in said hanging plate;
   reel means affixed to said plate;
   line means affixable at one end to a lower corner of the picture to be hung and at the other end to the reel means; and
   means for adjusting the length of the line means whereby the picture may be securely leveled by the adjustment of the length of the line.

10. The picture hanging and straightening device of claim 9 wherein said line means is a monofilament line.

* * * * *